United States Patent
Watanabe et al.

(10) Patent No.: US 9,542,098 B2
(45) Date of Patent: Jan. 10, 2017

(54) DISPLAY CONTROL APPARATUS AND METHOD OF CONTROLLING DISPLAY CONTROL APPARATUS

(71) Applicant: CANON KABUSHIKI KAISHA, Tokyo (JP)

(72) Inventors: Kazuhiro Watanabe, Tokyo (JP); Wataru Kaku, Yokohama (JP); Hiroyuki Fukushima, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 14/166,560

(22) Filed: Jan. 28, 2014

(65) Prior Publication Data
US 2014/0215342 A1    Jul. 31, 2014

(30) Foreign Application Priority Data
Jan. 30, 2013   (JP) .................. 2013-015702

(51) Int. Cl.
*G06F 3/0481* (2013.01)
*G06F 3/0488* (2013.01)
*G06F 3/0484* (2013.01)

(52) U.S. Cl.
CPC ....... *G06F 3/04886* (2013.01); *G06F 3/04842* (2013.01)

(58) Field of Classification Search
CPC .................................................. G06F 3/0481
See application file for complete search history.

(56) References Cited

U.S. PATENT DOCUMENTS

| 2005/0138570 A1* | 6/2005 | Good | G06F 3/0481 715/789 |
| 2009/0162828 A1* | 6/2009 | Strachan | G06F 17/30056 434/350 |
| 2010/0131573 A1* | 5/2010 | Reese | G06F 3/0481 707/812 |
| 2011/0107214 A1* | 5/2011 | Kouznetsov | G11B 27/034 715/716 |

FOREIGN PATENT DOCUMENTS

JP    P2005-204021 A    7/2005

* cited by examiner

*Primary Examiner* — Peiyong Weng
(74) *Attorney, Agent, or Firm* — Canon U.S.A., Inc. IP Division

(57) ABSTRACT

A display control apparatus includes a reading unit configured to read allocation data in which categories of images to be displayed in a slide show are associated with display periods, a display control unit configured to display a selection screen that allows selection of a plurality of images for each of the categories based on the allocation data read by the reading unit, a selection unit configured to select images to be allocated to each of the categories based on a user operation performed on the selection screen, and a playing unit configured to sequentially play a plurality of images based on the images allocated to each of the categories in the selection and also based on the allocation data.

8 Claims, 11 Drawing Sheets

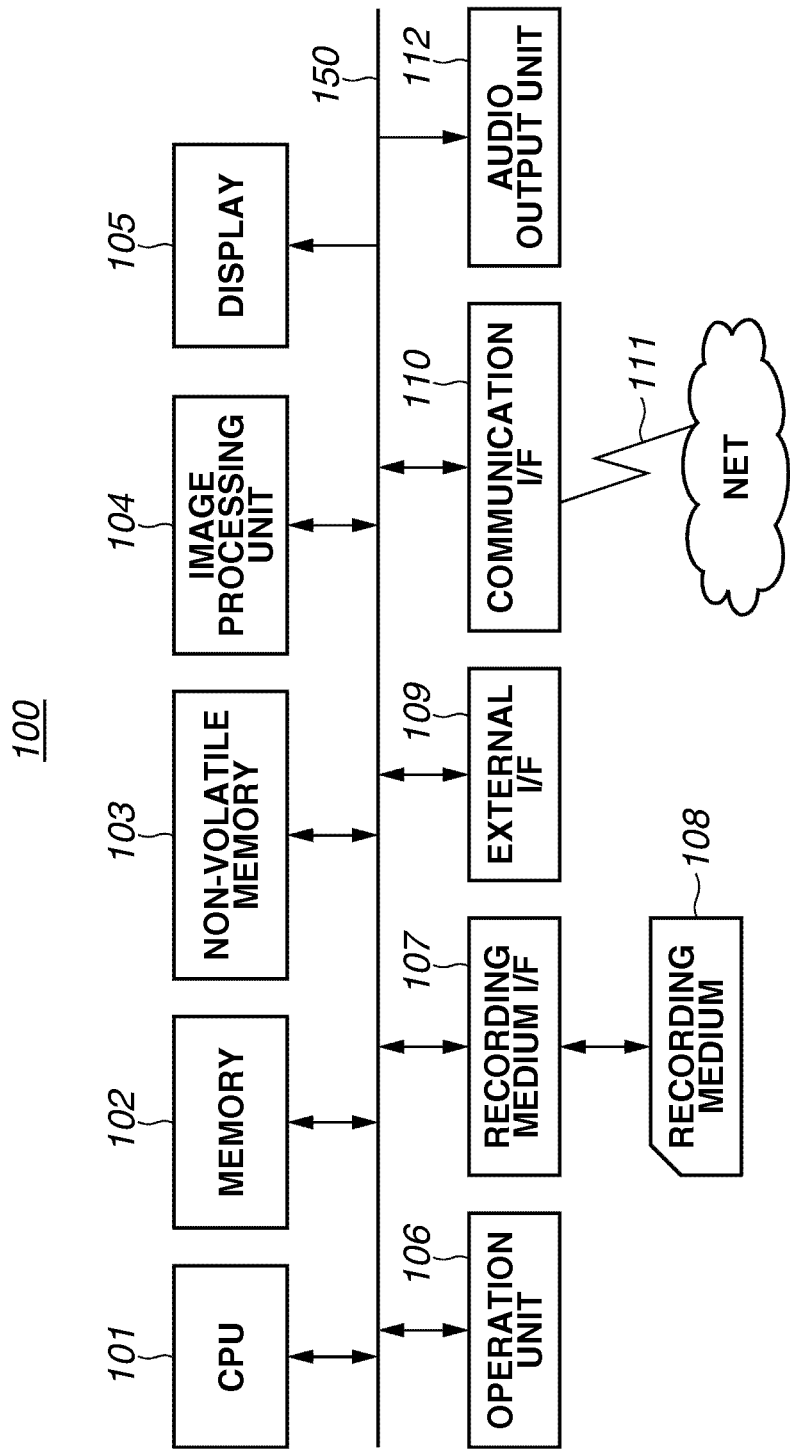

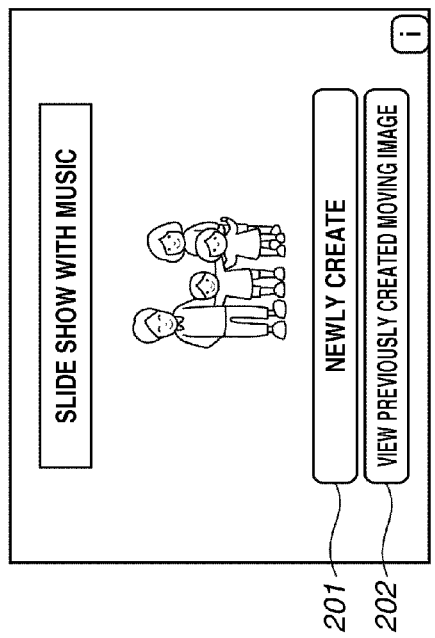

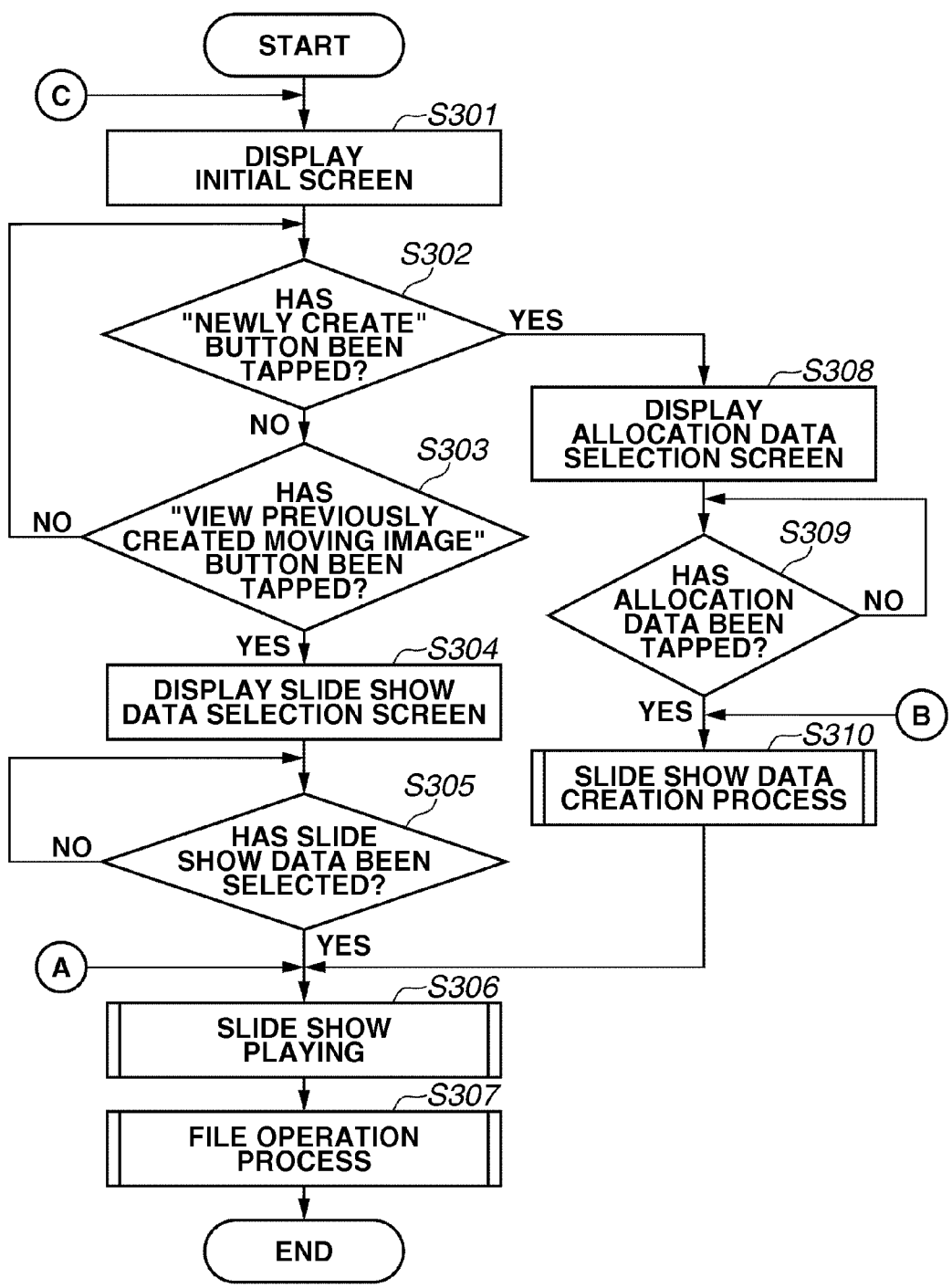

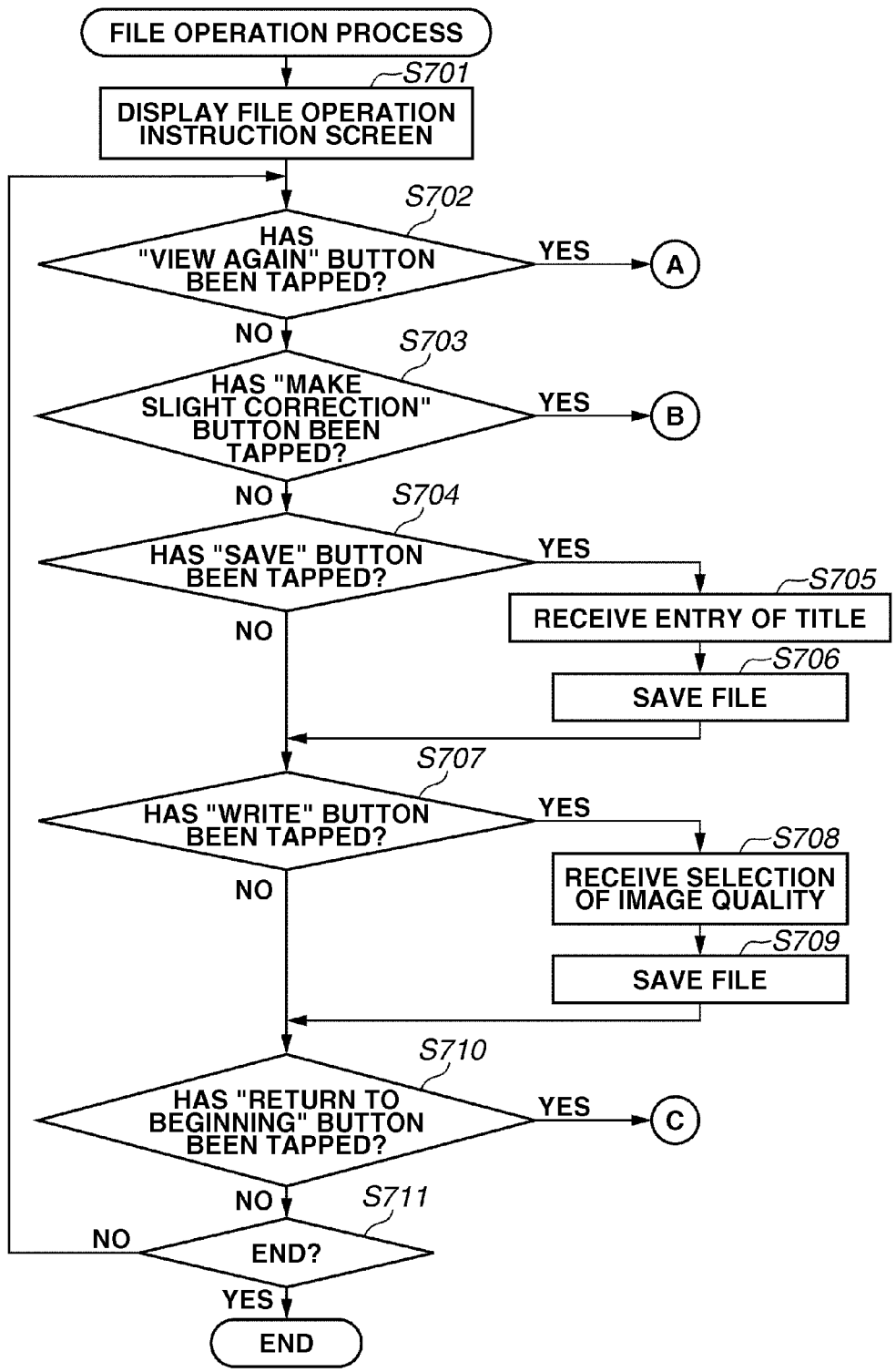

FIG.8

```
<?xml version="1.0" encoding="shift_jis"?>
<slideshowAllocationData>
<audio file="./audio/nekoneko.mp3"/>
<images storage="./images/"/>
<image id="1" t0="0:00:00" t1="0:25:00" effect="NONE" group="PHOTOGRAPHS OF CAT">
<image id="2" t0="0:25:00" t1="0:45:00" effect="NONE" group="BEST SHOTS OF CAT">
<image id="3" t0="0:45:00" t1="1:00:00" effect="NONE" group="WHAT CAT LIKES">
<image id="4" t0="1:00:00" t1="1:10:00" effect="NONE" group="PHOTOGRAPHS OF CAT">
<image id="5" t0="1:10:00" t1="1:25:00" effect="NONE" group="WHAT CAT LIKES">
<image id="6" t0="1:25:00" t1="1:45:00" effect="NONE" group="BEST SHOTS OF CAT">
<image id="7" t0="1:45:00" t1="2:00:00" effect="NONE" group="PHOTOGRAPHS OF OWNER">
...
</slideshowAllocationData>
```

```
<?xml version="1.0" encoding="shift_jis"?>
<slideshowImageAllocationData>
  <audio file="./audio/nekoneko.mp3" />
  <images storage="./images/" />
  <searchCondition name="PHOTOGRAPHS OF CAT"
    key="imageRecognitionObject('cat')*imageRecognitionQuantity('1')-imageRating('5')" >
  <searchCondition name="BEST SHOTS OF CAT"
    key="imageRecognitionObject('cat')*imageRecognitionQuantity('1')*imageRating('5')" >
  <searchCondition name="WHAT CAT LIKES"
    key="imageRating('5')-imageRecognitionObject('cat')" >
  <searchCondition name="PHOTOGRAPHS OF OWNER"
    key="imageRecognitionObject('human')*imageRecognitionQuantity('1')" >
    <image id="1" t0="0:00:00" t1="0:25:00" effect="NONE" group="PHOTOGRAPHS OF CAT" >
    <image id="2" t0="0:25:00" t1="0:45:00" effect="NONE" group="BEST SHOTS OF CAT" >
    <image id="3" t0="0:45:00" t1="1:00:00" effect="NONE" group="WHAT CAT LIKES" >
    <image id="4" t0="1:00:00" t1="1:10:00" effect="NONE" group="PHOTOGRAPHS OF CAT" >
    <image id="5" t0="1:10:00" t1="1:25:00" effect="NONE" group="WHAT CAT LIKES" >
    <image id="6" t0="1:25:00" t1="1:45:00" effect="NONE" group="BEST SHOTS OF CAT" >
    <image id="7" t0="1:45:00" t1="2:00:00" effect="NONE" group="PHOTOGRAPHS OF OWNER" >
</slideshowImageAllocationData>
```

FIG.10A

| IMAGE | IMAGE 5 | IMAGE 10 | IMAGE 3 | IMAGE 15 | IMAGE 7 |
|---|---|---|---|---|---|
| | 0:00  0:10 | 0:20  0:30  0:40  0:50 | 1:00  1:10  1:20 | 1:30  1:40  1:50 | 2:00:30  2:10:40  2:20:50  2:00 |
| LYRICS | A CAT IS LYING... | I AM WATCHING IT... | THE CAT YAWNED... | BY THE WAY, MY CAT LIKES THIS... | AND ALSO LIKES SOMETHING LIKE THIS... |
| SOUND | | | | | |

FIG.10B

BEST SHOTS OF CAT

| IMAGE | IMAGE 5 | IMAGE 10 | IMAGE 3 | IMAGE 15 | IMAGE 7 |
|---|---|---|---|---|---|
| | 0:00  0:10 | 0:20  0:30  0:40  0:50 | 1:00  1:10  1:20 | 1:30  1:40  1:50 | 2:00:30  2:10:40  2:20:50  2:00 |
| LYRICS | A CAT IS LYING... | I AM WATCHING IT... | THE CAT YAWNED... | BY THE WAY, MY CAT LIKES THIS... | AND ALSO LIKES SOMETHING LIKE THIS... |
| SOUND | | | | | |

DISPLAY CONTROL APPARATUS AND METHOD OF CONTROLLING DISPLAY CONTROL APPARATUS

BACKGROUND

Field

The present subject matter relates to a display control apparatus for creating a slide show in which images are switched and displayed, a method of controlling a display control apparatus, a program, and a recording medium.

Description of the Related Art

A slide show with music is known in which images captured using a digital camera are switched and played with background music (BGM). The slide show with music enables the playing of a slide show more entertaining for a user than a slide show without sound.

Japanese Laid-Open Patent Application No. 2005-204021 discusses, as a method of creating a slide show with music, a technique for, if either one of music or images has been selected, automatically selecting the other. For example, if a user has selected music that the user wishes to use as BGM, an apparatus extracts the feature amount of the music data and automatically selects images to be displayed according to the feature of the music.

With a method discussed in Japanese Laid-Open Patent Application No. 2005-204021 where an apparatus automatically selects images, images desired by the user may not be displayed in the slide show. If, however, the user manually allocates images to be displayed according to the playing periods of the music data, this requires an enormous amount of work, and, therefore, prevents the user from easily creating an impressive slide show.

SUMMARY

The present subject matter is directed to a display control apparatus that allows selection of images for use in a slide show by an easier and more efficient operation.

According to an aspect of the present subject matter, a display control apparatus includes a reading unit configured to read allocation data in which categories of images to be displayed are associated with positions, in playing order, of the images, a display control unit configured to display a selection screen that allows selection of a plurality of images for each of the categories based on the allocation data read by the reading unit, a selection unit configured to select images to be allocated to each of the categories based on a user operation performed on the selection screen, and a control unit configured to perform control so that a plurality of images are played sequentially, based on the images allocated to each of the categories in the selection, and also based on the allocation data.

Further features of the present subject matter will become apparent from the following description of exemplary embodiments with reference to the attached drawings.

BRIEF DESCRIPTION OF THE DRAWINGS

FIG. 1 is a configuration block diagram of a display control apparatus according to an exemplary embodiment of the present subject matter.

FIGS. 2A, 2B, 2C, 2D, 2E, 2F, 2G, and 2H are examples of the display for the creation of a slide show according to an exemplary embodiment of the present subject matter.

FIG. 3 is an overall flow chart illustrating the creation of a slide show according to an exemplary embodiment of the present subject matter.

FIG. 7 is a flow chart of a file operation process.

FIG. 8 illustrates an example of allocation data according to a first exemplary embodiment.

FIG. 9 illustrates an example of allocation data according to a second exemplary embodiment.

FIGS. 10A and 10B illustrate examples of the display of a detailed editing screen.

DESCRIPTION OF THE EMBODIMENTS

Figure 2E:
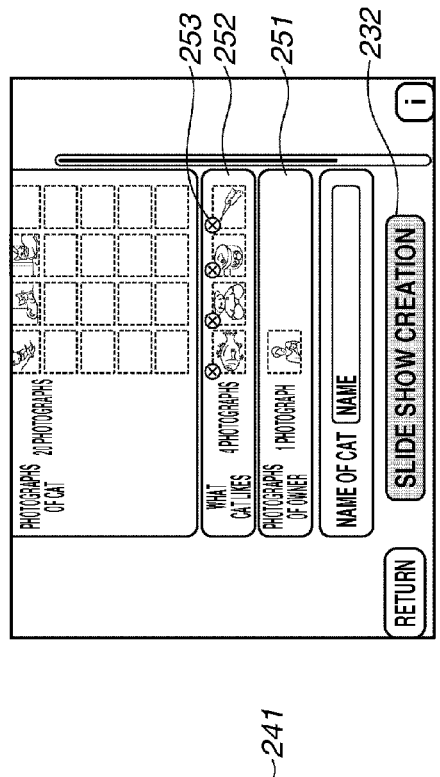

Various exemplary embodiments, features, and aspects of the subject matter will be described in detail below with reference to the drawings.

FIG. 1 illustrates an example of the configuration of a display control apparatus 100 according to a first exemplary embodiment. The display control apparatus 100 is configurable using a personal computer (hereinafter referred to as a "PC").

In FIG. 1, an internal bus 150 is connected to a central processing unit (CPU) 101, a memory 102, a non-volatile memory 103, an image processing unit 104, a display 105, an operation unit 106, a recording medium interface (I/F) 107, an external I/F 109, a communication I/F 110, and an audio output unit 112. The components connected to the internal bus 150 can exchange data with one another via the internal bus 150.

The memory 102 is, for example, a random-access memory (RAM) (a volatile memory using semiconductor devices). The CPU 101 uses the memory 102 as a work memory to control the components of the display control apparatus 100 according to a program stored, for example, in the non-volatile memory 103. The non-volatile memory 103 stores image data, audio data, other types of data, and various programs for the operation of the CPU 101. The non-volatile memory 103 is, for example, a hard disk (HD) or a read-only memory (ROM).

Under the control of the CPU 101, the image processing unit 104 performs various types of image processing on image data stored in the non-volatile memory 103 or a recording medium 108, an image signal acquired via the external I/F 109, or image data acquired via the communication I/F 110. The types of image processing to be performed by the image processing unit 104 include an analog-to-digital (A/D) conversion process, a digital-to-analog (D/A) conversion process, and an encoding process, a compression process, a decoding process, an enlargement and reduction process (resizing), a noise reduction process, and a color conversion process on the image data. The image processing unit 104 may be configured using a dedicated circuit block for performing specific image processing. Alternatively, depending on the type of image processing, the CPU 101 can also perform the image processing according to a program without using the image processing unit 104.

Under the control of the CPU 101, the display 105 displays an image and a GUI screen, which forms a graphical user interface (GUI). The CPU 101 generates a display control signal according to a program, and controls the components of the display control apparatus 100 to generate an image signal for displaying on the display 105 and to output the image signal to the display 105. The display 105 displays an image based on the output image signal. The configuration of the display control apparatus 100 itself may include up to an interface for outputting the image signal for displaying on the display 105, and the display 105 may be configured using an external monitor (television).

The operation unit 106 is an input device for receiving a user operation. The input device includes a textual information input device such as a keyboard, a pointing device such as a mouse or a touch panel, a button, a dial, a joystick, a touch sensor, and a touchpad. A touch panel is an input device formed in a planar manner on top of the display 105 to output coordinate information according to a contact position on the touch panel.

The recording medium 108, such as a memory card, a compact disc (CD), or a digital versatile disc (DVD), can be attached or mounted to the storage medium I/F 107. Under the control of the CPU 101, the storage medium I/F 107 reads and writes data to and from the attached or mounted recording medium 108. The external I/F 109 is an interface for connecting to an external device via wired or wireless connection to input and output an image signal and an audio signal. The communication I/F 110 is an interface for communicating with an external device or the Internet 111 to transmit and receive various types of data such as a file and a command.

The audio output unit 112 includes an amplifier for amplifying sound, a speaker for producing sound, and an earphone jack for externally outputting an audio signal. The audio output unit 112 outputs the played sound of audio data (a music file) recorded in the recording medium 108 or the non-volatile memory 103. In the playing of a slide show with music according to the present exemplary embodiment, the CPU 101 outputs music data (or sound other than music) from the audio output unit 112, and also switches and displays images on the display 105 in synchronization with the music data.

When the operation unit 106 includes a touch panel, the CPU 101 can detect the following operations on, or the following states of, the touch panel.

the state where a finger or a pen is brought into contact with the touch panel (hereinafter referred to as a "Touch-Down")

the state where the finger or the pen is in contact with the touch panel (hereinafter referred to as a "Touch-On")

the state where the finger or the pen is moving while maintaining the finger or the pen in contact with the touch panel (hereinafter referred to as a "Touch-Move")

the state where the finger or the pen having been in contact with the touch panel is separated from the touch panel (hereinafter referred to as a "Touch-Up")

the state where nothing is in contact with the touch panel (hereinafter referred to as a "Touch-Off")

The CPU 101 is notified via the internal bus 150 of these operations and states and the position coordinates where the finger or the pen is in contact with the touch panel. Based on the information in the notification, the CPU 101 determines what type of operation has been performed on the touch panel. In the case of a Touch-Move, the CPU 101 can also determine, based on changes in the position coordinates, the moving direction of the finger or the pen on the touch panel with respect to each of the vertical and horizontal components on the touch panel. Further, if a user has continuously performed a Touch-Down, a certain Touch-Move, and a Touch-Up on the touch panel, a stroke is regarded to be drawn. The operation of quickly drawing a stroke is referred to as a "flick". A flick is the operation of quickly moving a finger some distance while maintaining the finger in contact with the touch panel, and then separating the finger from the touch panel subsequently to the quick movement. In other words, a flick is the operation of quickly tracing the touch panel with a finger in a flipping manner. If a Touch-Move performed a predetermined distance or more at a predetermined speed or more has been detected and a Touch-Up has been detected subsequently to the Touch-Move, the CPU 101 can determine that a flick has been performed. Further, if a Touch-Move performed a predetermined distance or more at less than a predetermined speed has been detected, the CPU 101 determines that a drag has been performed. Further, a short touch without a Touch-Move is referred to as a "tap". If a Touch-Up has been detected within a predetermined time after a Touch-Down had been detected, the CPU 101 determines that a tap has been performed. The touch panel may be any of touch panels of various types such as a resistive type, an electrostatic capacitance type, a surface acoustic wave type, an infrared type, an electromagnetic induction type, an image recognition type, and an optical sensor type.

FIGS. 2A to 2H illustrate examples to be displayed on the display 105 in a series of operations from the creation to the playing and to the saving of a slide show with music according to the present exemplary embodiment.

FIG. 2A illustrates an example of the display of an initial screen when a program for creating and viewing a slide show with music has been started. A "newly create" button 201 and a "view previously created moving image" button 202 are displayed as touch buttons (the touch buttons are display items to each of which a predetermined function is allocated so that if the display item has been touched, the allocated function is executed). If the "newly create" button 201 has been tapped, the initial screen transitions to the screen in FIG. 2B.

FIG. 2B illustrates an allocation data selection screen that allows the selection of any one of a plurality of pieces of allocation data. Allocation data is data in which music data and the categories of images to be displayed in each period of the playing of the music data are recorded in association with each other. In the allocation data in the initial state, only the categories of images to be displayed are associated with the music data. Thus, it is determined, based on a user operation described later, which images are to be specifically associated with the music data. The details of the allocation data will be described later with reference to FIG. 8. In FIG. 2B, optional items 211 and 212 representing different pieces of allocation data are displayed. If either of the optional items 211 and 212 has been tapped, the allocation data is selected, and the allocation data selection screen transitions to the screen in FIG. 2C.

FIG. 2C illustrates a slide show creation screen for allocating images to the selected allocation data. On the slide show creation screen, the following are displayed for each category: a category name 221 (i.e., a keyword for the category) of images to be selected by the user; the number of required images 222; and an image entry field 223 for allocating images to the category.

If a required number of images have not been selected for the category, the image entry field 223 is displayed in an active display mode (e.g., displayed in white). If the required number of images has been selected for the category, the image entry field 223 grays out and is displayed in an inactive display mode (e.g., displayed in gray). FIG. 2C illustrates a part of the upper side of the slide show creation screen. The operation of a scroll bar 224 enables the display of the lower side of the slide show creation screen as illustrated in FIG. 2D. In FIG. 2D, a text entry field 231 is a field for entering text to be displayed in a certain period of the playing of the slide show. The selected allocation data defines the period in which the text entered in the text entry field 231 is to be displayed. The slide show creation button 232 is a touch button for receiving an instruction to play the slide show with music based on the images selected on the slide show creation screen and based also on the allocation data. In the initial state, the slide show creation button 232 is grayed out and an instruction by a tap is rejected. If the selection of a required number of images for the slide show and the entry of text in the text entry field 231 have been completed, the slide show creation button 232 is displayed in an active state and becomes ready to receive an instruction by a tap.

FIG. 2E illustrates an example of the display of a category-based image selection window 241, which is displayed in response to a tap on the image entry field 223. The category-based image selection window 241 is a window that allows the user to select images to be allocated to the category of the tapped image entry field 223. In the category-based image selection window 241, an album button 242, an OK button 243, and a list of thumbnails of images saved in a certain image storage area are displayed. When the album button 242 has been tapped, a screen for selecting the storage area of images to be displayed in the category-based image selection window 241 is displayed. When the OK button 243 has been tapped, the display of the category-based image selection window 241 is ended. When any one of the plurality of thumbnails displayed in the category-based image selection window 241 has been tapped, the image represented by the tapped thumbnail is allocated to the currently selected category. When any one of the thumbnails displayed in the category-based image selection window 241 has been selected (tapped), a thumbnail of the selected image is displayed in one of free areas in the image entry field 223 for the currently selected category, as illustrated in FIG. 2F. Further, an "already selected" mark 244 is displayed on the already selected thumbnail in the category-based image selection window 241 in a superimposed manner. Further, when a required number of images has been selected for the category for which the image selection operation is being performed (i.e., when the free areas in the image entry field 223 for the currently selected category have been filed), the image entry field 223 for the currently selected category grays out as in an image entry field 251 illustrated in FIG. 2G.

Figure 2G:
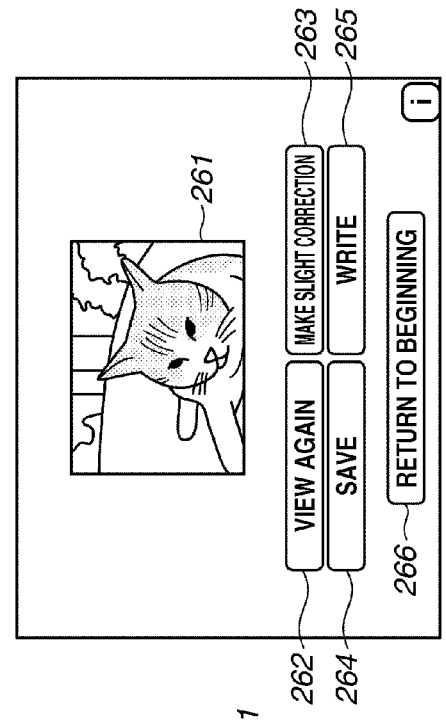
Figure 2F:
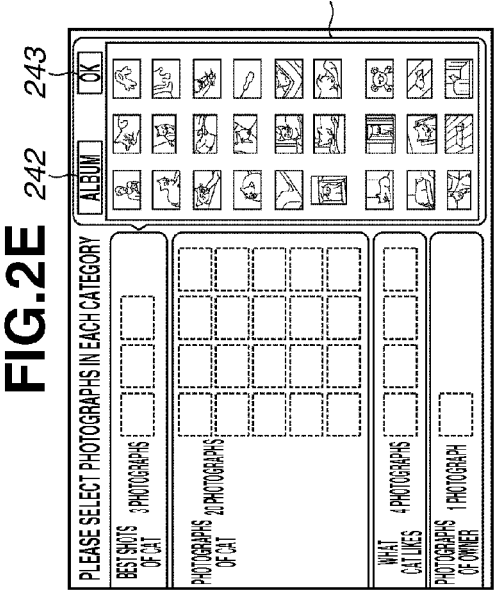

FIG. 2G illustrates an example of the display of the correction reception of already-selected images in an image entry field 252. When any one of thumbnails representing already selected images and displayed in the image entry field 252 has been touched for a predetermined time or more, the image entry field 252 enters the state of receiving the correction of the already selected images, and a deletion area 253 is displayed for each of the thumbnails of the already selected images. In this state, the image entry field 252 receives the drag of each thumbnail. It is possible to replace images with each other within the same category according to a drag operation to change the order of display in the slide show. Further, when any one of the deletion areas 253 has been tapped, the selection of the already selected image is cancelled, the thumbnail is deleted, and the deletion area 253 returns to a free area. The user can display the category-based image selection window 241 described above to select an image to be allocated to the free area anew.

Figure 2H:
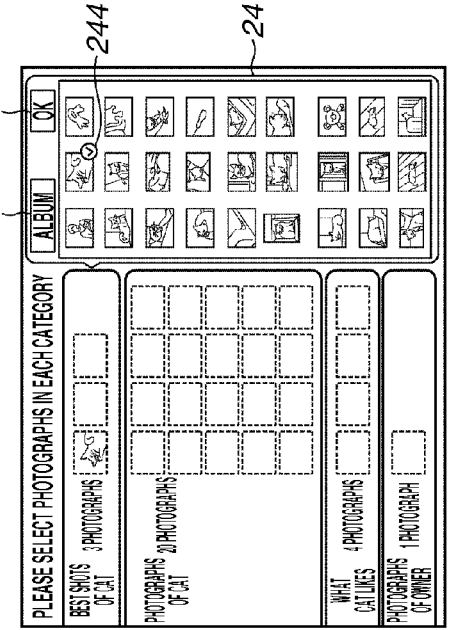

When the required number of images has been selected for all the categories and also text has been entered in the text entry field 231, the slide show creation button 232 is activated. When the activated slide show creation button 232 has been tapped, the slide show is played. When an instruction to stop the slide show has been received from the user during the playing of the slide show, or when the playing of the slide show has been performed to the end, a file operation instruction screen illustrated in FIG. 2H is displayed. On the file operation instruction screen, the user can give an instruction to view the slide show again, make a slight correction, save the allocation data to which the images are allocated, or write the slide show as a moving image file.

In the slide show to be thus played, the appearance order (display time order) of the images is determined based on the allocation data, and does not necessarily coincide with the arrangement order of the images on the slide show creation screen described above. That is, the appearance order is not arranged such that after the three images displayed in the image entry field for "best shots of cat" on the slide show creation screen have been displayed sequentially from the left, and then the images displayed in the image entry field for best shots among "photographs of cat" placed next are displayed sequentially from the upper left. The appearance order may be arranged, for example, such that after the first image displayed in the image entry field for "best shots of cat" has been displayed, the first image displayed in the image entry field for best shots among "photographs of cat" is displayed. Then, after an image in another category has been displayed, the second image displayed in the image entry field for "best shots of cat" is displayed. As described above, on the slide show creation screen, the user does not select images based on the order in which the images appear in the playing of the slide show, but selects a plurality of images for each category. Thus, the user can collectively search for the images that are displayed in different parts of a slide show with music as the slide show progresses over time at a time from the same categorical viewpoint, and efficient operation can be realized.

With reference to FIGS. 3 to 7, descriptions are given of flow charts of the processing for achieving the series of operations from the creation to the playing and to the saving of a slide show with music, which are described above using the examples of the display. The processing in FIGS. 3 to 7 is achieved by the CPU 101 using the memory 102 as a work memory to execute a program recorded in the non-volatile memory 103.

When the program for creating and playing a slide show with music according to the present exemplary embodiment has been started, the CPU 101 starts the processing illustrated in FIG. 3.

In step S301, the CPU 101 displays an initial screen as illustrated in FIG. 2A.

In step S302, the CPU 101 determines whether the "newly create" button 201 has been tapped. If the CPU 101 has determined that the "newly create" button 201 has been tapped (YES in step S302), the processing proceeds to step S308. If not (NO in step S302), the processing proceeds to step S303.

In step S303, the CPU 101 determines whether the "view previously created moving image" button 202 has been tapped. If the "view previously created moving image" button 202 has been tapped (YES in step S303), the processing proceeds to step S304. If not (NO in step S303), the processing returns to step S302.

In step S304, the CPU 101 reads pieces of slide show data recorded in the recording medium 108, and displays a list of the pieces of slide show data on the display 105. Slide show data is data that has been generated based on the selection of images by the user on the slide show creation screen, and in which the images have been allocated to the allocation data described above. That is, slide show data is data in which the file names and the storage locations of allocated images are described in addition to the allocation data.

In step S305, the CPU 101 determines whether any one of the plurality of pieces of slide show data displayed on the display 105 has been selected by the user, for example, with tapping the data. If any one of the pieces of slide show data has been selected (YES in step S305), the processing proceeds to step S306. If not (NO in step S305), the CPU 101 waits for any one of the pieces of slide show data to be selected.

In step S306, the CPU 101 plays a slide show based on the slide show data. This process will be described later with reference to FIG. 6.

In step S307, the CPU 101 performs a file operation process based on the slide show data. This process will be described later with reference to FIG. 7.

If, on the other hand, the "newly create" button 201 has been tapped on the initial screen (YES in step S302), then in step S308, the CPU 101 reads pieces of allocation data recorded in advance in the recording medium 108, and displays the allocation data selection screen as illustrated in FIG. 2B.

In step S309, the CPU 101 determines whether any one of optional items representing the pieces of allocation data displayed on the display 105 has been tapped (selected). If any one of the optional items has been tapped (YES in step S309), the processing proceeds to step S310. If not (NO in step S309), the CPU 101 waits for any one of the optional items to be tapped.

In step S310, the CPU 101 performs a slide show data creation process.

Figure 4:
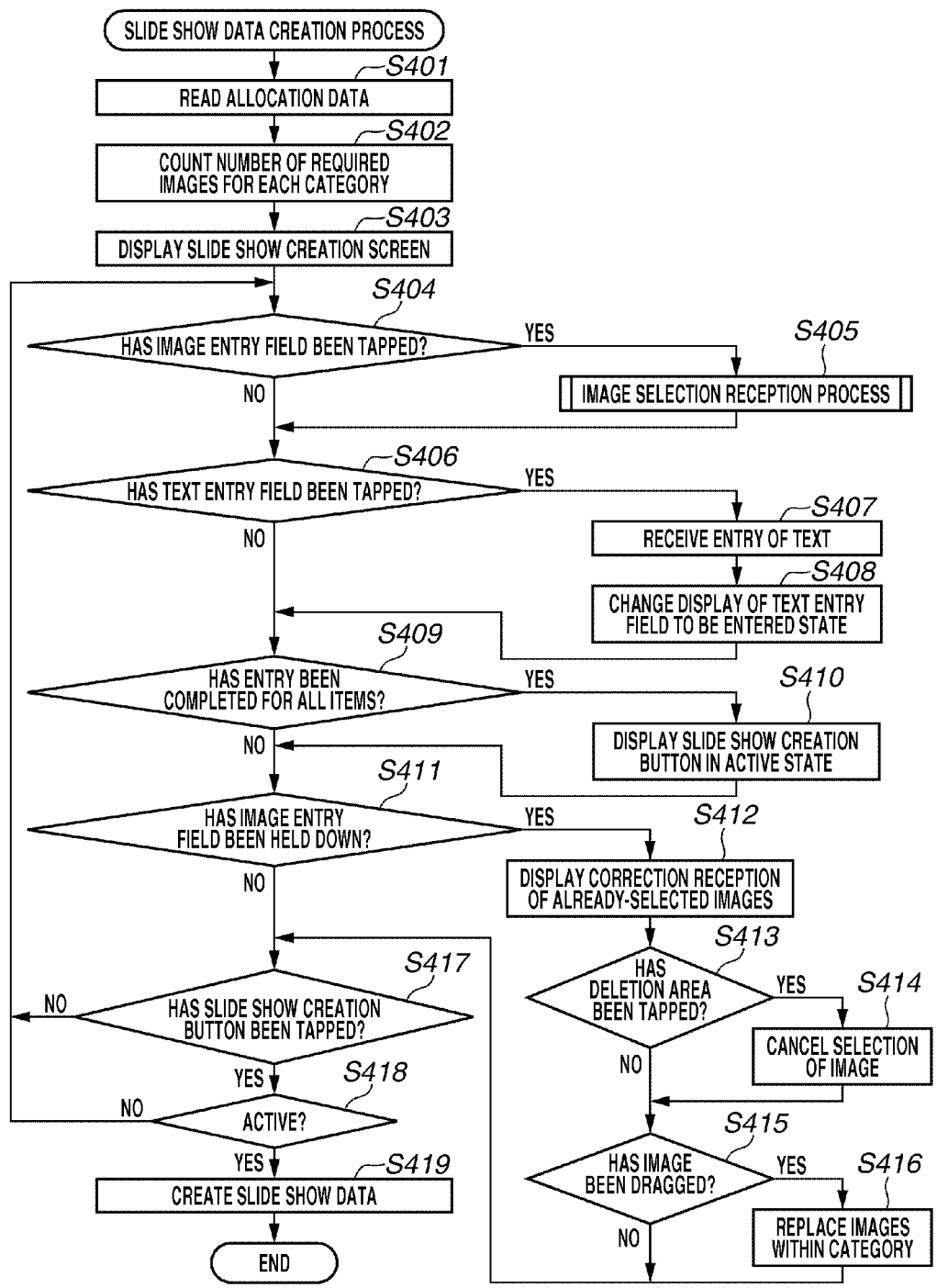
FIG. 4 is a flow chart of a slide show data creation process.

FIG. 4 illustrates a flow chart of the slide show data creation process. This process is the details of the process of step S310 in FIG. 3 described above.

In step S401, the CPU 101 reads (loads) the allocation data selected in step S309 from the recording medium 108 into the memory 102.

In step S402, the CPU 101 counts the number of required images for each category based on the content described in the allocation data read in step S401.

In step S403, the CPU 101 displays a slide show creation screen on the display 105 based on the allocation data read in step S401. The slide show creation screen is the screen described in FIGS. 2C to 2G. The number of required images 222 for each category is displayed based on the count in step S402.

In step S404, the CPU 101 determines whether any one of image entry fields displayed for the respective categories (e.g., the image entry field 223 in FIG. 2C) has been tapped. If any one of the image entry fields has been tapped, the category corresponding to the tapped image entry field has been selected as a category to which the user allocates images (i.e., a category for which the user selects images). If the CPU 101 has determined that any one of the image entry fields has been tapped (YES in step S404), the processing proceeds to step S405. If not (NO in step S404), the processing proceeds to step S406.

In step S405, the CPU 101 performs an image selection reception process. In the image selection reception process, the CPU 101 displays a category-based image selection window as described in FIGS. 2E and 2F to receive from the user the selection of images for the currently selected category. The details of this process will be described later with reference to FIG. 5.

In step S406, the CPU 101 determines whether a text entry field (e.g., the text entry field 231 in FIG. 2D) has been tapped. If the CPU 101 has determined that the text entry field has been tapped (YES in step S406), the processing proceeds to step S407. If not (NO in step S406), the processing proceeds to step S408.

In step S407, the CPU 101 displays a software keyboard on the display 105 to receive a text entry operation from the user. If text has been entered, then in step S408, the CPU 101 displays the entered text in the text entry field on the slide show creation screen and also displays the text entry field in a grayed-out state to indicate that text has already been entered.

In step S409, the CPU 101 determines whether the entry has been completed in all of the image entry fields and the text entry field displayed on the slide show creation screen. If the CPU 101 has determined that required numbers of images have been selected for all the category items (categories) and also text has been entered in the text entry field (YES in step S409), the processing proceeds to step S410. If not (NO in step S409), the processing proceeds to step S411.

In step S410, the CPU 101 changes the display mode of the slide show creation button 232 from the grayed-out state to the active state. Thus, the slide show creation button 232 for receiving an instruction to start the playing of the slide show becomes ready to receive an instruction to start the playing of the slide show. Consequently, it is possible to prevent the creation of a slide show with music that is incomplete due to an insufficiency of number of selected images and text. The creation of a high-quality slide show, therefore, can be promoted. In the process of step S410, the display mode of the slide show creation button 232 is changed from the grayed-out state to the active state. Alternatively, the slide show creation button 232 may be set to a non-display mode in the initial state, and may then be displayed according to the result that the determination has been "YES" in step S409.

In step S411, the CPU 101 determines whether any one of the image entry fields in which at least one image had already been selected has been held down (touched for a predetermined time or more). If any one of the image entry fields in which at least one image had already been selected has been held down (YES in step S411), the processing proceeds to step S412. If not (NO in step S411), the processing proceeds to step S417. Even if any one of the image entry fields in which no image had been selected has been held down, the determination will not be "YES" in step S411.

In step S412, the CPU 101 displays the correction reception of already-selected images. That is, as described in FIG. 2G, the CPU 101 displays a deletion area 253 for each of the thumbnails of the already selected images displayed in the image entry field.

In step S413, the CPU 101 determines whether any one of the deletion areas 253 has been tapped. If any one of the deletion areas 253 has been tapped (YES in step S413), the processing proceeds to step S414. If not (NO in step S413), the processing proceeds to step S415.

In step S414, the CPU 101 cancels the selection of the already selected image corresponding to the tapped deletion area 253. Thus, the thumbnail displayed in the image display field set to be non-displayed, and a free area is displayed. Further, the CPU 101 clears information, which is stored in association with the allocation data in the memory 102, about the already selected image corresponding to the tapped deletion area 253.

In step S415, the CPU 101 determines whether the operation has been performed by dragging any one of the thumbnail images displayed with the deletion areas 253. If the CPU 101 has determined that any one of the thumbnail images has been dragged (YES in step S415), the processing proceeds to step S416. If not (NO in step S415), the processing proceeds to step S417.

In step S416, the CPU 101 rearranges the order of images within the same category according to the drag operation. More specifically, if the dragged image has been dropped on another image within the same category, the CPU 101 rearranges the order of images by replacing the position of the dragged image with the position of the other image at the dropping destination of the dragged image. This enables the rearrangement of the appearance order of images within the same category in the slide show. For example, it is assumed that the allocation data defines the image displayed at the far left of the image entry field for "what cat likes" as being displayed during the period from 45 seconds to 1 minute 0 seconds (referred to as a "period 3") after the start of the slide show and also after the display of two images in other categories. Further, it is also assumed that the allocation data defines an image displayed second from the left in the image entry field for "what cat likes" as being displayed during the period from 1 minute 10 seconds to 1 minute 25 seconds (referred to as a "period 5") after the start of the slide show and also after the display of four other images. That is, it is assumed that among the images displayed in the image entry field for "what cat likes", the leftmost image is to be displayed (to appear) first in the slide show. Then, after the display of images in other categories, the second image from the left in the image entry field for "what cat likes" is to be displayed next. In such a case, the processes by the drag operation in steps S415 and S416 enable the replacement of, for example, the image to be displayed in a period 1 with the image to be displayed in a period 2. Further, it is not allowed to replace a dragged image with an image allocated to a category different from the category to which the dragged image is allocated (i.e., such an operation is rejected). The above-described process prevents images selected for each category (i.e., images selected from the same viewpoint) from being displayed in a period in which images in a different category (from a different viewpoint) should be displayed in the slide show, and, therefore, impairing the quality of the slide show is prevented.

In step S417, the CPU 101 determines whether the slide show creation button 232 has been tapped. If the CPU 101 has determined that the slide show creation button 232 has been tapped (YES in step S417), the processing proceeds to step S418. If not (NO in step S417), the processing returns to step S404.

In step S418, the CPU 101 determines whether the slide show creation button 232 had been activated by the process of step S410. If the slide show creation button 232 had been activated (YES in step S418), the processing proceeds to step S419. If the slide show creation button 232 had not been activated (NO in step S418), the CPU 101 rejects an instruction by the tap on the slide show creation button 232, and the processing returns to step S404.

In step S419, the CPU 101 creates slide show data based on the images selected by the user and displayed in each image entry field on the slide show creation screen, and the text displayed in the text entry field. That is, the CPU 101 creates data in which the saving areas and the file names of the images are allocated to the playing positions in the allocation data held in the memory 102. After the process of step S419, the processing proceeds to step S306 in FIG. 3 described above, and the CPU 101 plays a slide show. The process of step S306 will be described later with reference to FIG. 6.

Figure 5:
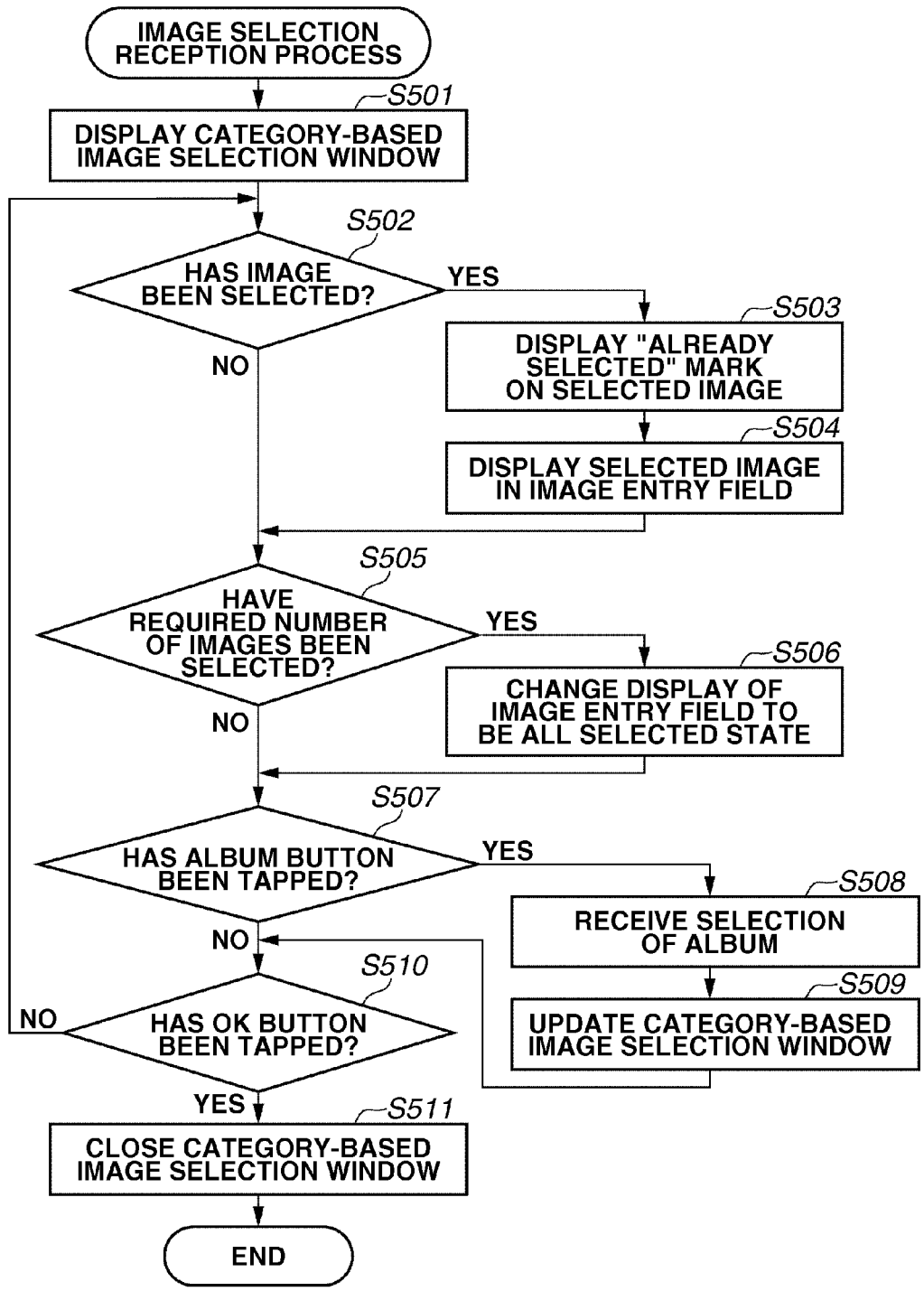
FIG. 5 is a flow chart of an image selection reception process.

FIG. 5 illustrates a flow chart of the image selection reception process. This process is the details of the process of step S405 in FIG. 4 described above.

In step S501, the CPU 101 displays the category-based image selection window 241 on the display 105 in addition to the slide show creation screen, as illustrated in FIG. 2E. The image entry fields having been displayed before the category-based image selection window 241 has been moved to the left to secure a space for displaying the image selection window 241.

In step S502, the CPU 101 determines whether any one of thumbnail images displayed as a list in the category-based image selection window 241 has been tapped. If the CPU 101 has determined that any one of the thumbnail images has been tapped (YES in step S502), the processing proceeds to step S503. If not (NO in step S502), the processing proceeds to step S505. When a required number of images have already been selected for the currently selected category, even if any one of the thumbnail images has been tapped, the CPU 101 rejects the selection of the tapped thumbnail image, and the determination is "NO" in step S502.

In step S503, the CPU 101 displays an "already selected" mark 244 on the tapped image, as illustrated in FIG. 2F. Next, in step S504, the CPU 101 displays the same thumbnail as the thumbnail, which has been tapped and on which the "already selected" mark 244 has been displayed, at a location that has been a free area in the image entry field for the currently selected category.

In step S505, the CPU 101 determines whether or not a required number of images have been selected for the category to which images are currently being allocated. If the CPU 101 has determined that the required number of images have been selected (YES in step S505), the processing proceeds to step S506. If not (NO in step S505), the processing proceeds to step S507.

In step S506, the CPU 101 changes the display mode of the image entry field corresponding to the currently selected category to indicate that the required number of images have already been selected. For example, the CPU 101 grays out the image entry field as in the image entry field 251 illustrated in FIG. 2G.

In step S507, the CPU 101 determines whether the album button 242 displayed in an upper portion of the category-based image selection window 241 has been tapped. If the CPU 101 has determined that the album button 242 has been tapped (YES in step S507), the processing proceeds to step S508. If not (NO in step S507), the processing proceeds to step S510.

In step S508, the CPU 101 displays a list of albums in which images are stored, and the CPU 101 receives the selection of an album. Not only an album but also any saving area desired by the user can be specified. A saving area that can be specified may be any saving area, so long as the CPU 101 can acquire images from the saving area. Such a saving area can be specified in an external device or on the Internet connected to the recording medium 108, the non-volatile memory 103, or the communication I/F 110. Further, the user may specify a search condition so that images found by the search can be displayed in the category-based image selection window 241.

In step S509, the CPU 101 updates the display of the category-based image selection window 241 by replacing the thumbnail images displayed in the category-based image selection window 241 with thumbnail images of the images saved in the saving area specified in step S508.

In step S510, the CPU 101 determines whether the OK button 243 displayed in an upper portion of the category-based image selection window 241 has been tapped. If the OK button has been tapped (YES in step S510), the processing proceeds to step S511. If not (NO in step S510), the processing returns to step S502, and the CPU 101 repeats the process described above.

In step S511, the CPU 101 closes the category-based image selection window 241 to be non-displaying, and ends the allocation (selection) of images for the currently selected category. Then, the processing proceeds to step S406 in FIG. 4.

Figure 6:
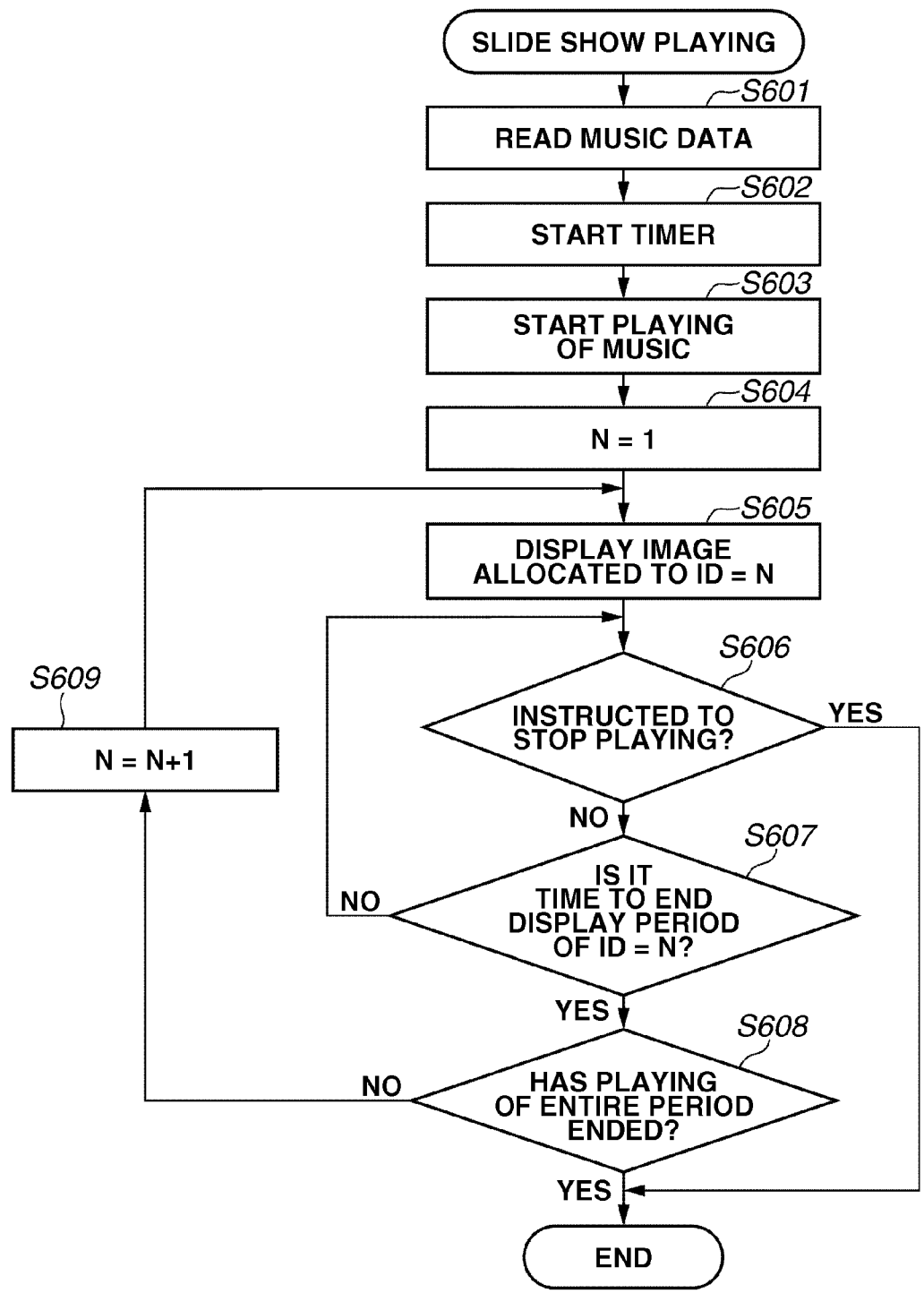
FIG. 6 is a flow chart of a slide show playing process.

FIG. 6 illustrates a flow chart of the slide show playing process. This process is the details of the process of step S306 in FIG. 3.

In step S601, the CPU 101 reads music data associated with the slide show data selected in step S305 in FIG. 3 or the slide show data created in step S419 in FIG. 4.

In step S602, the CPU 101 starts a timer for measuring the time from the start of the playing of the music (or sound other than music) of the music data.

In step S603, almost simultaneously with the start of the timer in step S602, the CPU 101 plays the music data read in step S601, and outputs the sound of the music data by the playing from the audio output unit 112.

In step S604, the CPU 101 initializes a variable N to 1. The variable N represents the position in order of images displayed in the slide show with music.

In step S605, in synchronization with the start of the playing of the music data in step S603, the CPU 101 displays on the display 105 an image of which the identifier (ID) described in the slide show data is N. The CPU 101 first displays an image allocated to N=1, that is, an image of which the ID is 1. The playing of the slide show with music is thus started. Thereafter, the CPU 101 sequentially switches and displays images of which the IDs are represented by the variable N, which is incremented over time.

In step S606, the CPU 101 determines whether the CPU 101 has received an instruction by the user to stop the playing. The user can instruct the CPU 101 to stop the playing by, for example, tapping an arbitrary position on the display 105 during the playing of the slide show with music. If the CPU 101 has determined that the CPU 101 has received an instruction to stop the playing (YES in step S606), the CPU 101 ends the slide show playing process. If the CPU 101 has not been instructed to stop the playing (NO in step S606), the processing proceeds to step S607.

In step S607, with reference to the timer started in step S602, the CPU 101 determines whether it is time to end the display period of the currently displayed image allocated to ID=N. The slide show data defines in advance the display period of the image allocated to ID=N. If the display period ends (YES in step S607), the processing proceeds to step S608.

In step S608, the CPU 101 determines whether the playing of the entire period of the slide show with music has ended. If the CPU 101 has determined that the playing of the entire period has not ended (NO in step S608), then in step S609, the CPU 101 increments the variable N by 1, and the processing returns to step S605. If the CPU 101 has determined that the playing of the entire period of the slide show with music has ended (YES in step S608), the CPU 101 ends the slide show playing process, and the processing proceeds to step S307 in FIG. 3.

By such a process illustrated in FIG. 6, based on the images allocated to each category and the allocation data (more specifically, based on the slide show data created based on the allocation data), a slide show is performed in which a plurality of images are sequentially displayed in time to music.

Next, FIG. 7 illustrates a flow chart of the file operation process. This process is the details of the process of step S307 in FIG. 3 described above.

After the playing of the slide show has ended, first, in step S701, the CPU 101 displays a file operation instruction screen on the display 105. FIG. 2H illustrates an example of the display of the file operation instruction screen. On the file operation instruction screen, a representative image 261 of the slide show with music, a "view again" button 262, a "make slight correction" button 263, a "save" button 264, a "write" button 265, and a "return to beginning" button 266 are displayed.

In step S702, the CPU 101 determines whether the "view again" button 262 has been tapped. If the CPU 101 has determined that the "view again" button 262 has been tapped (YES in step S702), the processing returns to step S306 in FIG. 3 described above. Then, the CPU 101 plays the slide show with music again. If the CPU 101 has determined that the "view again" button 262 has not been tapped (NO in step S702), the processing proceeds to step S703.

In step S703, the CPU 101 determines whether the "make slight correction" button 263 has been tapped. If the CPU 101 has determined that the "make slight correction" button 263 has been tapped (YES in step S703), the processing returns to the slide show data creation process of step S310 in FIG. 3 described above. Then, the CPU 101 receives the correction of the allocation of images for each category. If the processing proceeds to the slide show data creation process from step S703, the correction of already selected images is assumed unlike when the processing proceeds to the slide show data creation process by pressing the "newly create" button in step S302. Thus, if the processing proceeds to the slide show data creation process from step S703, the CPU 101 may display a guidance such as "please hold down image to be corrected" to guide the user on how to perform an operation for entering the state of receiving the correction for already selected images. If the "make slight correction" button 263 has not been tapped (NO in step S703), the processing proceeds to step S704.

In step S704, the CPU 101 determines whether the "save" button 264 has been tapped. If the "save" button 264 has been tapped (YES in step S704), the processing proceeds to step S705. If not (NO in step S704), the processing proceeds to step S707.

In step S705, the CPU 101 displays a software keyboard on the display 105 to receive from the user the entry of the title of the slide show data. If the user has entered the title and operated determination of the saving of the title, the processing proceeds to step S706. In step S706, the CPU 101 records the slide show data in the recording medium 108 with the entered title. Alternatively, the CPU 101 may save the slide show data by specifying the destination other than the recording medium 108. The saved slide show data is displayed as an option for slide show data selectable as a previously created moving image in step S304 in FIG. 3 described above.

In step S707, the CPU 101 determines whether the "write" button 265 has been tapped. If the CPU 101 has determined that the "write" button 265 has been tapped (YES in step S707), the processing proceeds to step S708. If not (NO in step S707), the processing proceeds to step S710.

In step S708, the CPU 101 displays options for the image quality of moving image data to be written on the display 105, and receives from the user the selection of the image quality for the writing. The options include, for example, a full high-definition (HD) image quality (corresponding to 1920×1080 pixels, an aspect ratio of 16:9) and a DVD image quality (corresponding to 640×480 pixels, an aspect ratio of 4:3). Further, the CPU 101 may individually receive the entry of the file name of a moving image file from the user. If the slide show data already has a title, the title of the slide show data is initially displayed as the file name of a moving image file to be written. If the user has selected the image quality and operated determination of the saving of the image quality in step S708, the processing proceeds to step S709.

In step S709, the CPU 101 records the slide show with music as a moving image file in the recording medium 108 with the image quality selected in step S708 based on the slide show data. The CPU 101 may record the moving image file by specifying the destination other than the recording medium 108. The slide show data cannot be played if the slide show data cannot be interpreted by the program according to the present exemplary embodiment. Further, the slide show data cannot be played if the images and the music data to be referenced cannot be acquired. However, editing, such as the replacement of images, is allowed in the state of the slide show data. Meanwhile, the moving image file recorded in step S709 is a general moving image file. Thus, even if the moving image file is moved to another device, the playing of the moving image file is enabled with the moving image file itself and a moving image playing function.

In step S710, the CPU 101 determines whether the "return to beginning" button 266 has been tapped. If the CPU 101 has determined that the "return to beginning" button 266 has been tapped (YES in step S710), the processing returns to step S301 in FIG. 3 described above. If not (NO in step S710), the processing proceeds to step S711.

In step S711, the CPU 101 determines whether the CPU 101 has been instructed to end the program according to the present exemplary embodiment. If the CPU 101 has not been instructed to end the program (NO in step S711), the processing returns to step S702, and the CPU 101 repeats the process described above. If the CPU 101 has been instructed to end the program (YES in step S711), the processing ends.

FIG. 8 illustrates an example of the allocation data described above. Information 801 is information of audio data associated with the allocation data, and describes the recording area and the file name of a music file. Information 802 is information of the storage area for referencing images. Information 803 describes the following for each ID: a time 804 when the display of the image is started; a time 805 when the display is ended; a display effect 806; and a category (group) 807 to which the image belongs. FIG. 8 illustrates the allocation data described in the Extensible Markup Language (XML) format as a data structure format. The data description method, however, is not limited to this format.

After the images have been selected for each category in the allocation data by the above slide show data creation process, then in the creation of slide show data in step S419, the CPU 101 creates slide show data by automatically allocating each of the selected images to any one of IDs belonging to the selected category. That is, the slide show data is data in which reference information is added to the above allocation data. The reference information (the storage area and the file name) indicates which image is allocated to each ID. In the above example, when images have been selected for a certain category, it is determined which one of IDs belonging to the same category is to be allocated to each image is based on the arrangement order of display in the image entry field. The present exemplary embodiment, however, is not limited to this. Alternatively, the images may be randomly allocated to IDs within the same category. Yet alternatively, the images may be analyzed, and control may be performed so that the images are allocated to appropriate IDs according to the results of the analyses.

The allocation data described in FIG. 8 is, for example, created in advance manually by a creator. In the allocation data, music data and the display period and the effect for each ID are determined to match the tempo, the melody, the sound volume, and the lyrics of a composition in the music data. That is, the allocation data is a template in which the category of an image, the timing of the display of the image in music, and the manner of display of the image are determined in advance. An end user allocates images to each category in the allocation data according to the above-described exemplary embodiment, and thereby can create a high-quality slide show far more easily than designating the display timing and the effects of the images themselves. Additionally, the images to be displayed are selected by category by the user. This enables the user to create a slide show that matches the user's intention better than a slide show created completely automatically. Further, according to the present exemplary embodiment, the method of selecting images is not the method of searching for and allocating images one by one from the beginning in order of appearance in a slide show, but the method of collectively selecting images with respect to one category. Thus, it is possible to search for a plurality of images from the same viewpoint with respect to one category, and therefore the operation of selecting images can be effectively performed.

The allocation data is described as being recorded in advance in the recording medium 108, but is not limited to this. The allocation data may be downloaded from the Internet via the communication I/F 110. This enables the use of allocation data created by various creators, and therefore, an end user can create a wider range of slide shows. Further, an end user may specify music data that the end user wishes to use in a slide show. Then, accordingly, the CPU 101 may analyze the music data, extract information of the tempo, the melody, the sound volume, and the lyrics, and automatically generate allocation data based on the extracted information.

According to a second exemplary embodiment, a description is given with an example of the use of allocation data in which conditions for an image to be initially displayed in the category-based image selection window 241 according to the first exemplary embodiment are defined with respect to each category.

FIG. 9 illustrates an example of allocation data according to the second exemplary embodiment. In FIG. 9, pieces of information 801 to 803 are similar to those illustrated in FIG. 8. FIG. 9 is different from FIG. 8 in that information 901 is added. The information 901 describes search conditions for an image to be initially displayed in the category-based image selection window 241 with respect to each category (group). For example, the information 901 describes search conditions for searching for the following image. In connection with the category "best shots of cat", the result of image recognition is a "cat", the number of objects in the image is 1, and the value of an evaluation (rating) is 5. Then, before step S501 in FIG. 5 described above, the CPU 101 determines what category has been selected, and the CPU 101 acquires search conditions for the selected category from an allocation unit. Then, the CPU 101 searches the saving area (search range) determined in advance in the acquired search conditions. Then, in step S501, the CPU 101 displays images found by the search. That is, images to be displayed in the opened category-based image selection window 241, that is, a group of images serving as candidates for images to be allocated to the selected category differs depending on the selected category. Further, the CPU 101 additionally displays a "specify search condition" button as a touch button in the category-based image selection window 241. The user taps the "specify search condition" button, and thereby can specify optional search condition. Then, it is possible to search for images using the specified search condition, and replace the display of the category-based image selection window 241 with a group of images found by the search. If the images found by the search do not include a desired image, it is possible to add an image displayed by another program to the category-based image selection window 241 by drag and drop. Further, if the images displayed in the category-based image selection window 241 include an unnecessary image, it is also possible to specify (eliminate) the unnecessary image based on a user operation so as not to be displayed in the category-based image selection window 241. Based on the search condition, the added image, and the eliminated image thus specified by the user, the CPU 101 updates and records information about the corresponding category in the information 901 described in the allocation data. Thus, also when the user opens the category-based image selection window 241 next time and thereafter, the CPU 101 can display an image as an option corresponding to a condition previously specified by the user. The remaining processing is basically similar to that in the first exemplary embodiment.

According to the present exemplary embodiment, when the user selects images for each category item to create a slide show with music, images are narrowed down by search conditions corresponding to the category item and displayed. This enables easy and efficient selection of images. Further, if an image does not meet an initially set search condition, or if an image meets an initially set search condition but does not match the categorization intended by the user, the user can additionally display or eliminate those images on or from a screen by an operation, such as drag and drop.

In a third exemplary embodiment, a description is given with an example where a "detailed editing" button is additionally displayed on the file operation instruction screen described in the first exemplary embodiment, thereby enabling the detailed editing of slide show data.

In step S701 in FIG. 7 described above in the first exemplary embodiment, the CPU 101 additionally displays a "detailed editing" button on the file operation instruction screen described in FIG. 2H. Then, if the "detailed editing" button has been tapped, the CPU 101 opens a detailed editing screen. On the detailed editing screen, an editing timeline is displayed together with the playing area of the slide show. The remaining processing in FIG. 7 is similar to that described in the first exemplary embodiment.

FIGS. 10A and 10B illustrate examples of the display of a timeline portion on the detailed editing screen.

FIG. 10A illustrates a timeline initially displayed on the detailed editing screen. In the timeline, the images allocated in the slide show data and the waveform of the music data are arranged from left to right in chronological order along a time axis. In the example illustrated in FIG. 10A, the images displayed in an image display field 1001 are represented by numbers for convenience, but in practice, thumbnail images are displayed. Further, as the content of the music data, also the lyrics are displayed in association with the time axis. By viewing such display, the user can understand the image to be displayed, the lyrics to be output as sound, and the sound volume to be set at certain timing. If any one of the thumbnail images has been tapped on this screen, the screen transitions to the display in FIG. 10B. FIG. 10B is an example of the display when an image 5 has been tapped.

In FIG. 10B, a window 1002 is displayed. In the window 1002, all images allocated to IDs belonging to the same category as the category of the ID to which the image 5 tapped by the user is allocated are displayed. Further, the image display field 1001 is displayed in a display mode that allows distinction between an image (an image 3) allocated to an ID belonging to the same category as the category of the tapped image 5, and images (images 10, 15, and 7) allocated to IDs belonging to other categories. The images (the images 10, 15, and 7) allocated to IDs belonging to other categories are displayed in grayed-out display modes. In this state, the user can replace, within the same category, the position of an image activated after being tapped with the position of an image in the same category as the category of the activated image. For example, if the user has performed the operation of dragging the image 5 in the image display field 1001 and dropping the image 5 at the position of the image 3 in the image display field 1001, these images are replaced with each other and displayed. Further, if the user has dragged one of the images displayed in the window 1002 and dropped the dragged image at the position of the image 5 displayed in the image display field 1001, the user can replace the image dragged from the window 1002 with the image 5. Even if the user has dropped the dragged image at any one of the positions of the grayed-out images 10, 15, and 7, it is indicated that the drop operation is invalid, and the images are not replaced with each other. That is, the user cannot replace the image with an image allocated to an ID belonging to a different category.

According to the present exemplary embodiment, the user can replace images belonging to the same category item with each other, while confirming the progress positions of the images in a slide show. Thus, a slide show with music can be easily and efficiently created and edited by preventing the allocation of images from different categorical viewpoints.

In the above exemplary embodiments, the operations using the touch panel are described. The present subject matter, however, is not limited to the operations using the touch panel. Alternatively, the above exemplary embodiments according to the present subject matter may be performed by operations using another operation member, for example, a mouse. In this case, the above exemplary embodiments according to the present subject matter can be achieved by replacing the above tap with the clicking of the left button of the mouse, and also replacing the above holding down with the holding down of the left button of the mouse. Further, a cursor can be displayed, and the above tap can be replaced with the operation of moving the cursor using a directional button for four directions, namely up, down, left, and right directions, which is a mechanical button, and then pressing a determination button.

Further, a single piece of hardware may perform the above control of the CPU 101, or a plurality of pieces of hardware may share the processing to control the entire apparatus.

While the present subject matter has been described in detail based on the exemplary embodiments, the present subject matter is not limited to these specific exemplary embodiments, but includes various forms without departing from the scope of the subject matter. Further, the above exemplary embodiments merely illustrate exemplary embodiments of the present subject matter, and can also be appropriately combined with one another.

The above exemplary embodiments are described using the example where the present subject matter is applied to a personal computer (PC). The present subject matter, however, is not limited to this example, but is applicable to any display control apparatus capable of displaying an image. That is, the present subject matter is applicable to a PC, a personal digital assistant (PDA), a mobile phone terminal, a portable image viewer, a printer apparatus including a display, a digital photo frame, a music player, a game apparatus, an electronic book reader, and a digital camera including an image sensor.

Embodiments of the present subject matter can also be realized by a computer of a system or apparatus that reads out and executes computer executable instructions recorded on a storage medium (e.g., non-transitory computer-readable storage medium) to perform the functions of one or more of the above-described embodiment(s) of the present subject matter, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present subject matter has been described with reference to exemplary embodiments, it is to be understood that the subject matter is not limited to the disclosed exemplary embodiments. The scope of the following claims is to be accorded the broadest interpretation so as to encompass all such modifications and equivalent structures and functions.

This application claims the benefit of Japanese Patent Application No. 2013-015702 filed Jan. 30, 2013, which is hereby incorporated by reference herein in its entirety.

What is claimed is:

1. A display control apparatus comprising:
one or more processors; and
one or more computer-readable media storing one or more programs, the one or more programs comprising instructions that, when executed by the one or more processors, cause the one or more processors to perform operations comprising:
reading audio data and allocation data for playing the audio data in synchronism with images, a displaying timing of images in synchronism with the audio data and categories of the images being associated with each other in the allocation data;
selecting, by a user operation, images to be allocated, for each of the categories included in the allocation data;
receiving an instruction to change a displaying timing of an image from a first displaying timing to a second displaying timing;
determining a displaying order of the images, wherein the determining the displaying order comprises rearranging an order for displaying the images based on the instruction in a case where the second displaying timing is associated with a category to which the image is allocated, and wherein the determining the displaying order comprises rejecting the instruction to change the displaying timing of the image in a case where the second displaying timing is not associated with the category to which the image is allocated; and
performing control so that the audio data are played and images allocated to the categories are displayed at a displaying timing associated with the categories in the allocation data, to thereby display the images sequentially in the displaying order in synchronism with the audio data.

2. The display control apparatus according to claim 1, wherein the same category is associated with a different displaying timing in the allocation data.

3. The display control apparatus according to claim 2, the operations further comprising:
determining, for each of the categories, a number of images required to be allocated to the categories based on the allocation data.

4. The display control apparatus according to claim 3, the operations further comprising:
displaying a selection screen for selecting images to be allocated to categories for each of the categories, wherein the number of images required to be allocated to the categories is displayed on the selection screen for each of the categories.

5. The display control apparatus according to claim 2, wherein the performing control comprises controlling so that sequential display of the images synchronized with the audio data is not performed until the categories are allocated to the images required to be allocated for each of the categories.

6. The display control apparatus according to claim 1, wherein in the allocation data, the displaying timing of the images is able to be associated with the categories of the images so that an image of a different category is displayed between images of the same category.

7. A method of controlling a display control apparatus, the method comprising:
reading audio data and allocation data for playing the audio data in synchronism with images, a displaying timing of images in synchronism with the audio data and categories of the images being associated with each other in the allocation data;
selecting, by a user operation, images to be allocated, for each of the categories included in the allocation data;
receiving an instruction to change a displaying timing of an image from a first displaying timing to a second displaying timing;
determining a displaying order of the images, wherein the determining the displaying order comprises rearranging an order for displaying the images based on the instruction in a case where the second displaying timing is associated with a category to which the image is allocated, and wherein the determining the displaying order comprises rejecting the instruction to change the displaying timing of the image in a case where the second displaying timing is not associated with the category to which the image is allocated; and performing control so that the audio data are played and images allocated to the categories are displayed at a displaying timing associated with the categories in the allocation data, to thereby display the images sequentially in the displaying order in synchronism with the audio data.

8. A non-transitory computer-readable storage medium storing instructions that, when executed by a computer of a display control apparatus, cause the computer to perform operations comprising:

reading audio data and allocation data for playing the audio data in synchronism with images, a displaying timing of images in synchronism with the audio data and categories of the images being associated with each other in the allocation data;

selecting, by a user operation, images to be allocated, for each of the categories included in the allocation data;

receiving an instruction to change a displaying timing of an image from a first displaying timing to a second displaying timing;

determining a displaying order of the images, wherein the determining the displaying order comprises rearranging an order for displaying the images based on the instruction in a case where the second displaying timing is associated with a category to which the image is allocated, and wherein the determining the displaying order comprises rejecting the instruction to change the displaying timing of the image in a case where the second displaying timing is not associated with the category to which the image is allocated; and performing control so that the audio data are played and images allocated to the categories are displayed at a displaying timing associated with the categories in the allocation data, to thereby display the images sequentially in the displaying order in synchronism with the audio data.

\* \* \* \* \*